овый

United States Patent
Kitazaki et al.

(12) 
(10) Patent No.: US 6,181,507 B1
(45) Date of Patent: *Jan. 30, 2001

(54) INCREASED AND RANDOMIZED OUTPUT SAMPLING TO REDUCE POSITIONING NOISE IN A DATA STORAGE SYSTEM

(75) Inventors: Nobuyuki Kitazaki, Kanagawa; Kiyoshi Satoh, Ayase, both of (JP); Arun Sharma, New Rochelle; Sri Muthuthamby Sri-Jayantha, Ossining, both of NY (US); Isao Yoneda, Yokohama (JP)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/692,164

(22) Filed: Aug. 5, 1996

Related U.S. Application Data

(60) Provisional application No. 60/007,989, filed on Dec. 5, 1995.

(51) Int. Cl.$^7$ .................................................. G11B 5/596
(52) U.S. Cl. ..................................... 360/78.14; 360/78.04
(58) Field of Search .............................. 360/77.02, 77.07, 360/77.08, 78.14, 78.04

(56) References Cited

U.S. PATENT DOCUMENTS 5,510,939 * 4/1996 Lewis .............................. 360/77.07 X
5,721,648 * 2/1998 Phan et al. ..................... 360/78.08 X

* cited by examiner

Primary Examiner—Andrew L. Sniezek
(74) Attorney, Agent, or Firm—Heslin & Rothenberg, P.C.

(57) ABSTRACT

A method and system for reducing positioning noise in a data storage system are provided. An access device is positioned over a data storage medium using a stream of bursts stored on the medium. The bursts are sensed at a frequency determined by the rate at which the medium is moved relative to a sensing device. Output positioning values are provided to position the access device at a frequency higher than the frequency at which the positioning bursts are sensed, and/or at random times. The random times may be calculated as random advances or delays from time points occurring at a fixed frequency.

30 Claims, 11 Drawing Sheets

INCREASED AND RANDOMIZED OUTPUT SAMPLING TO REDUCE POSITIONING NOISE IN A DATA STORAGE SYSTEM

RELATED APPLICATION INFORMATION

This application claims the benefit of U.S. Provisional Application Ser. No. 60/007,989, entitled "Randomized Oversampling Servo Algorithm for Low Seek Acoustics," filed Dec. 5, 1995. The Provisional Application is hereby incorporated by reference herein in its entirety.

TECHNICAL FIELD

This invention relates to data storage systems. More particularly, this invention relates to a method and system for reducing the noise encountered when providing positioning values to an access device to position the access device over a data storage medium.

BACKGROUND OF THE INVENTION

Conventional sector servo direct access storage devices ("DASDs") have a fixed number of servo sectors (N) with the disks spinning at a fixed rotation speed (w revolutions per second). The sampling rate (or frequency) $f_S$ corresponds to N*w samples per second. The servo bursts in the servo sectors are referred to herein as a stream of positioning bursts, and the bursts of this stream are therefore sensed by a sensing device at the rate at which they move past the sensing device, or $f_S$. Digital servo controller designs are usually implemented assuming this sampling rate.

Seek acoustic noise generated by a DASD mechanism is a significant problem. The acoustic noise generated during seek arises from broadband forcing of the environmental components or from the excitation of "pure tone" modes at a well defined frequency $f_S$. It is critical to minimize seek acoustics without compromising the access performance of a DASD. Pure tone modes due to structural resonance can get amplified through the servo feedback process or due to roughness (significant step change) in the digital-to-analog converter ("DAC") output value.

The configuration of a typical DASD servo is shown in FIG. 1. An exemplary DASD 10 is depicted having a sensing device (actuator 14 coupled to read/write electronics 12). It should be understood to those skilled in the art that the terms "sensing device" and "access device" used herein should be construed broadly and without limitation to connote parts of the same subsystem within the DASD, or components of different subsystems. An access device (actuator 14, voice coil motor ("VCM") 15, and spindle/VCM Driver 22) is also depicted.

A position error signal ("PES") 32 (derived from a sensed position burst via line 30) from peak detecting demodulator 16 is initially sampled by an analog-to-digital converter 26 within a microprocessor unit ("MPU") 18 and sent to the hard disk controller ("HDC") 20 for PES non-linearity processing 24, where known distortion of the PES is first corrected (by the HDC without burdening the MPU). The linearized PES is sent back to the MPU for conventional seek servo computation in Seek/Settle/Tk-Follow subsystem 28. During seek, a velocity servo technique is used to produce an output positioning control value (referred to herein simply as a positioning value) denoted by $U_n$ where n is the sampling instant. For every sector denoted by n−1, n, n+1 . . . etc., a new control output or positioning value is computed (possibly provided by a DAC, and typically with some time delay) and sent to the access device via line 34. The positioning values 34 are therefore calculated as a function of the sensed positioning (servo) bursts stored on the storage medium.

What is required is a method and system which reduce the noise associated with the fixed frequency sampling rates of conventional servo systems, such as the one depicted in FIG. 1. The servo computation complexity should be minimized to maintain the use of low cost MPUs in DASD designs.

SUMMARY OF THE INVENTION

The shortcomings of the conventional approaches are overcome by the present invention which, in one aspect, is a method and system for positioning an access device used to access data on a data storage medium. The data storage medium has a stream of positioning bursts stored thereon. The data storage medium is moved relative to a sensing device such that at least some sequential positioning bursts of the stream of positioning bursts move past the sensing device at a first frequency. The at least some sequential positioning bursts are sensed with the sensing device. The access device is positioned using a stream of positioning values generated at a second frequency which is greater than the first frequency. One or more of the positioning values of the stream of positioning values are calculated as a function of respective bursts of the sequential positioning bursts.

For a first positioning burst of the sequential positioning bursts, a desired positioning value is generated relative to a present positioning value. An intermediate positioning value is also generated which has an amplitude between the present positioning value and the desired positioning value. The generated stream of positioning values (at the second frequency) therefore includes the desired positioning value and the intermediate positioning value. The device is positioned using the intermediate positioning value and the desired positioning value. The amplitude of the intermediate positioning value may be halfway between the present positioning value and the desired positioning value.

In another aspect, the present invention is a method and system for positioning an access device used to the access data on the data storage medium. Again, the data storage medium has a stream of positioning bursts stored thereon. The data storage medium is moved relative to a sensing device, and a first positioning burst of the stream of positioning bursts is sensed with the sensing device. The access device is positioned by asserting at least one positioning value beginning at at least one randomly calculated time point following the sensing of the first positioning burst. The at least one positioning value is calculated as a function of the first positioning burst.

A desired positioning value may be generated relative to a present positioning value, and an intermediate positioning value may also be generated having an amplitude between the present positioning value and the desired positioning value. In this case, the at least one positioning value includes the desired positioning value and the intermediate positioning value. The access device is positioned by asserting the intermediate positioning value at a first randomly calculated time point following the sensing of the first positioning burst, and the access device is then positioned by asserting the desired positioning value beginning at a second randomly calculated time.

The sequential positioning bursts may be sensed at a first frequency determined by the rate at which the medium is moved past the sensing device. In this case, the respective first randomly calculated time points and the respective second randomly calculated time points are each calculated as either a random advance or a random delay from respective time points occurring at a second frequency, the second frequency being greater than the first frequency.

According to the oversampling, randomized sampling, or randomized oversampling principles of the present invention, seek acoustic noise and pure tone build-up are minimized when positioning an access device used to access a data storage medium.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following detailed description of the preferred embodiment(s) and the accompanying drawings in which:

DETAILED DESCRIPTION OF THE PREFERRED EMBODIMENT(S)

Conventional seek servo systems update the DAC value at a sampling rate corresponding to the servo-sector rate $f_S$, which is determined by the rate at which the data storage medium moves past a sensing device. The servo system output, referred to herein as the positioning value, steps up or down by an amount computed by the conventional seek servo technique from $U_{n-1}$, to $U_n$ at sampling instant n. Movement of the medium relative to the sensing device can be accomplished by any relative type of motion between these two components.

The acoustic noise spectrum produced by the substantial DAC output change ($U_n - U_{n-1}$) is reduced and potential for pure tone build up is minimized utilizing the principles of the present invention. Output roughness and pure tone potential are reduced by computing a new low roughness DAC output sequence of length "m" which is then oversampled, possibly randomly, at a rate of "$mf_S$" samples per second. The additional positioning values generated by the oversampling are referred to herein as intermediate positioning values. $U_n$ is referred to herein as the desired positioning value, and $U_{n-1}$ is referred to herein as the present positioning value, with respect to $PES_n$.

The simplest output sequence corresponds to the linearly interpolated value(s) between $U_n$ and $U_{n-1}$. The resultant finely graduate DAC output sequence reshapes the acoustic spectrum in a desirable direction without compromising the seek performance.

Figure 2:
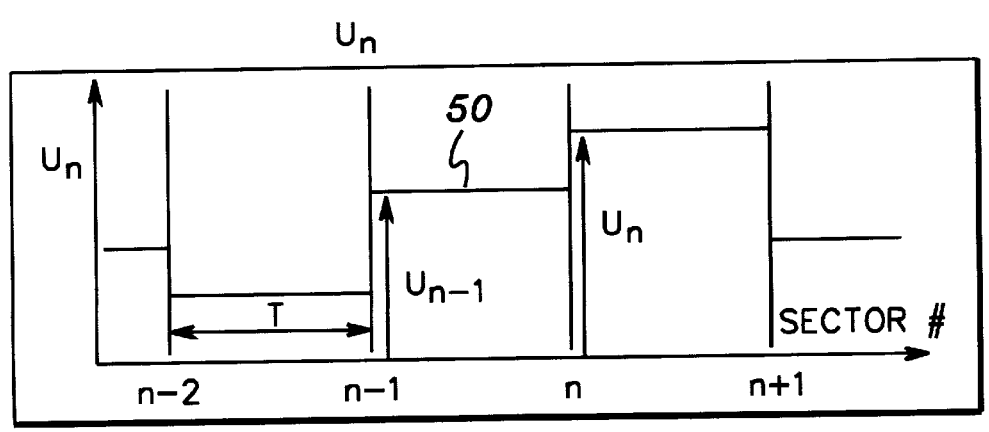
FIG. 2 depicts a stream of output positioning values produced by the positioning system of FIG. 1.

As depicted in FIG. 2, the output curve of a stream of positioning values 50 generated by a conventional seek servo undergoes a series of step changes for every sector n−2, n−1, n, n+1, etc. Logically, the higher the DAC step (i.e., the difference between the amplitudes of $U_n$ and $U_{n-1}$) the larger the undesired acoustic response of the DASD actuator system will be.

Figure 3A:
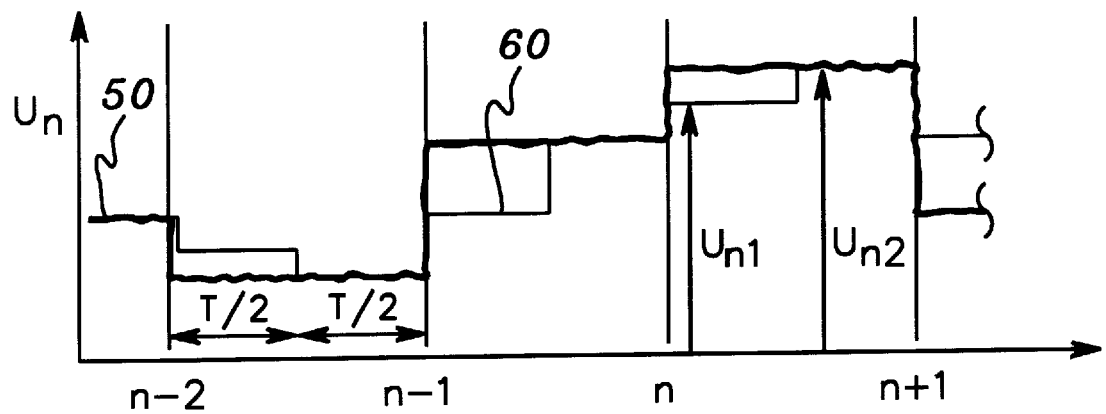
FIGS. 3a–b depict streams of positioning values provided in accordance with the present invention.

As shown in FIG. 3a, and in accordance with the present invention, output amplitude change is minimized, for example, by incrementing the value only by 50% of the original magnitude change but in two steps based on the doubling of the output sampling rate (i.e., m=2). In general, the desired amplitude jump can be achieved in m steps within a sector time and the output is oversampled at a general frequency of $mf_S$. The conventional output waveform 50 is shown with the overlayed, inventive output waveform 60 in FIG. 3a.

Simplicity of the technique is achieved by maintaining the proven, low complexity control scheme in the MPU intact, and by adding a post operation in the HDC which is simply a division by an integer number of the control step value (e.g., a simple shift operation). No measurable change in access time is expected by the oversampling operation. However, if warranted, some weighting factors can be used to scale the oversampled sequence, so that the time-integral of the control effort is kept identical to the conventional case at each PES sampling instant. In a generalized case, the oversampled sequence does not have to be equally spaced, and an optimum time interval between each sequence can be implemented specifically for any given DASD hardware structural dynamics.

The fixed interval oversampling reduces the spectral energy in the frequency range where the actuator components could be mechanically responsive. However, fixed interval oversampling does not eliminate the possibility of pure tone generation. A pure tone is generated when the forcing frequency and structural resonance are matched because of a fixed time interval DAC output that has a strong phase correlation with pure tone mechanics.

Therefore, in another embodiment of the present invention, the output timing of the stream of generated positioning values is randomized. In other words, rather than generating positioning values at fixed frequencies $f_S$ or $mf_S$, the output timing is randomized (e.g., as random advances or delays around the otherwise fixed time points occurring at $f_S$ or $mf_S$).

Figure 3B:
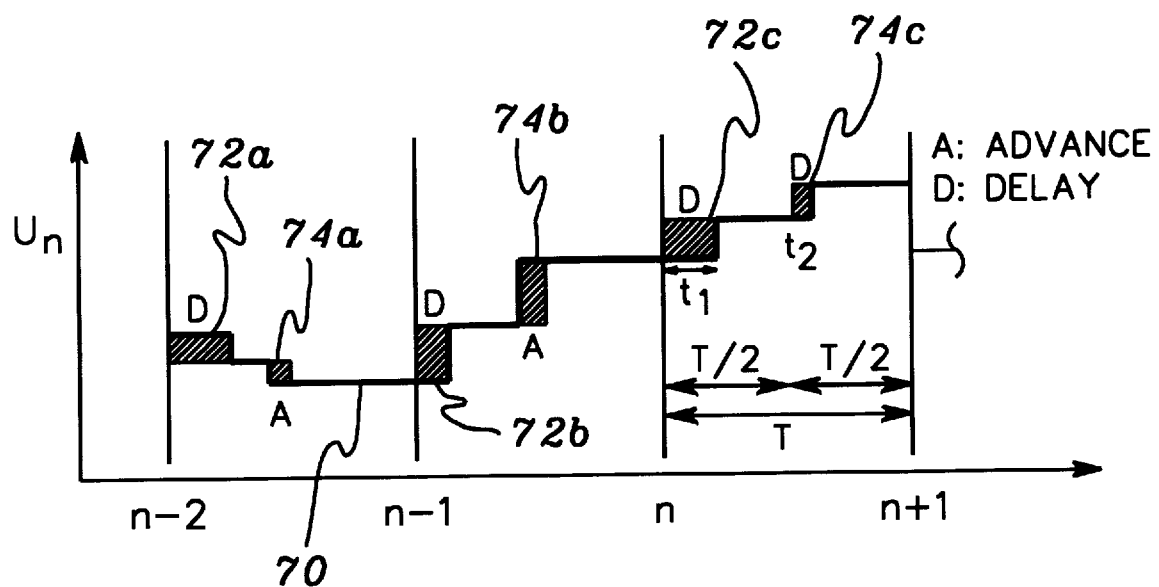

By randomizing the DAC output timing, as shown by the output waveform 70 in FIG. 3b, the possibility of locking into pure tone forcing is minimized. Both acoustic generation modes (output roughness & pure tone) are minimized by this embodiment of the present invention. In FIG. 3b, it can be observed that the first DAC output can only be delayed ("D", 72a, 72b, 72c) from the fixed sampling time whereas all other oversampled, intermediate outputs can either be delayed 74c or advanced ("A", 74a, 74b) with respect to the nominal sampling rate because their magnitude is known a priori.

It should be noted that the present invention involves oversampling of output values, randomizing the times at which output values are provided, or a combination of these two techniques.

Figure 4A:
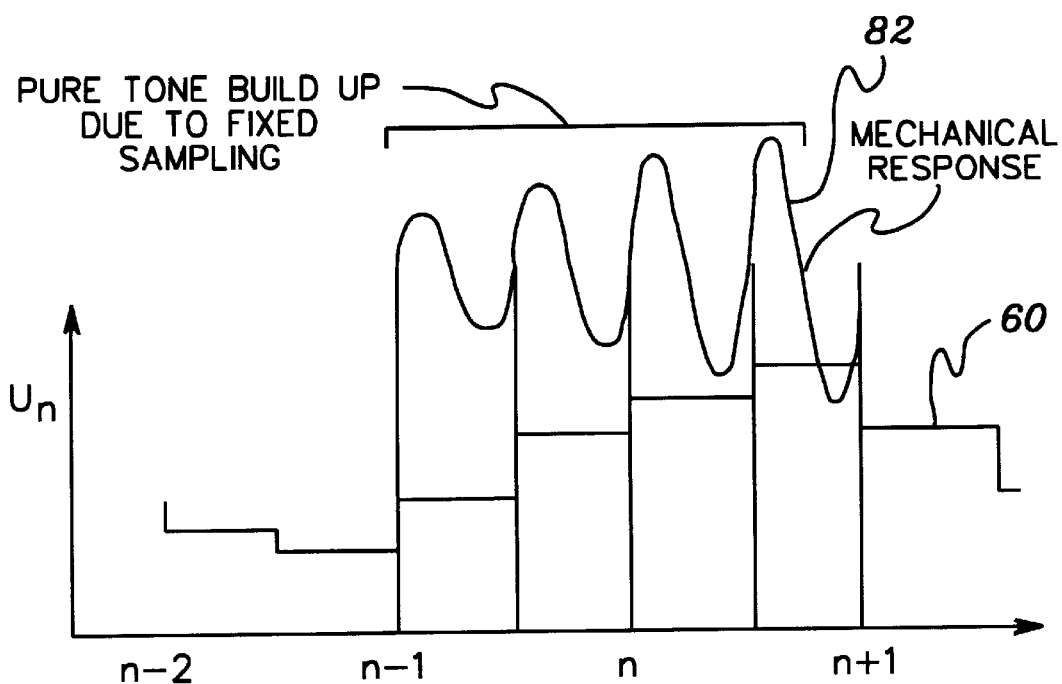
FIGS. 4a–b depict the streams of FIGS. 3a–b, and the expected resultant pure tone build-ups associated therewith.
Figure 4B:
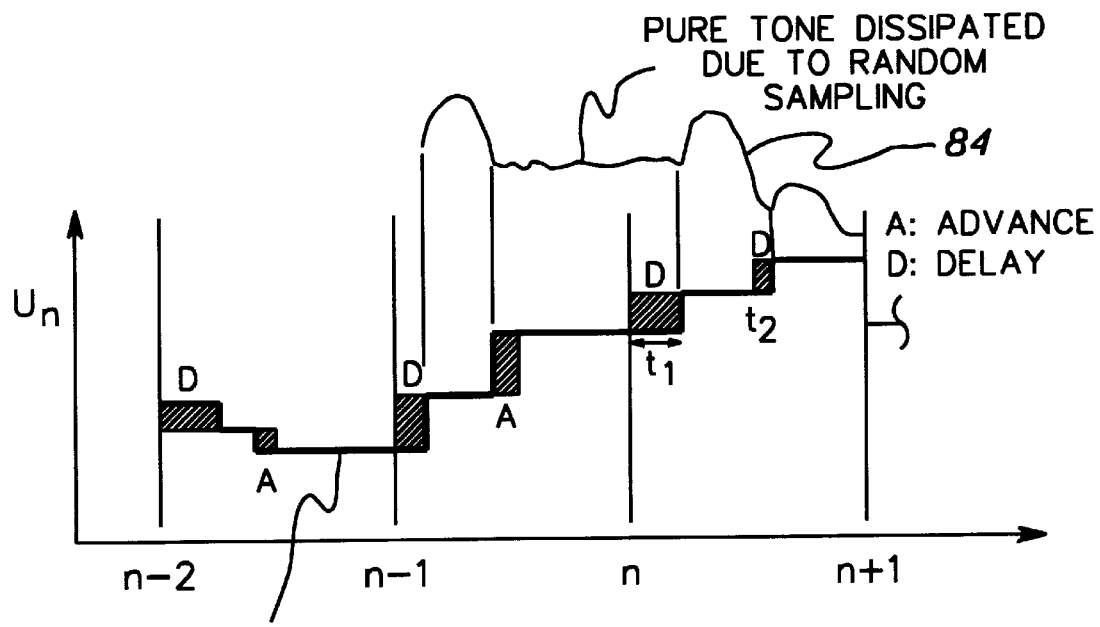
Figure 5A:
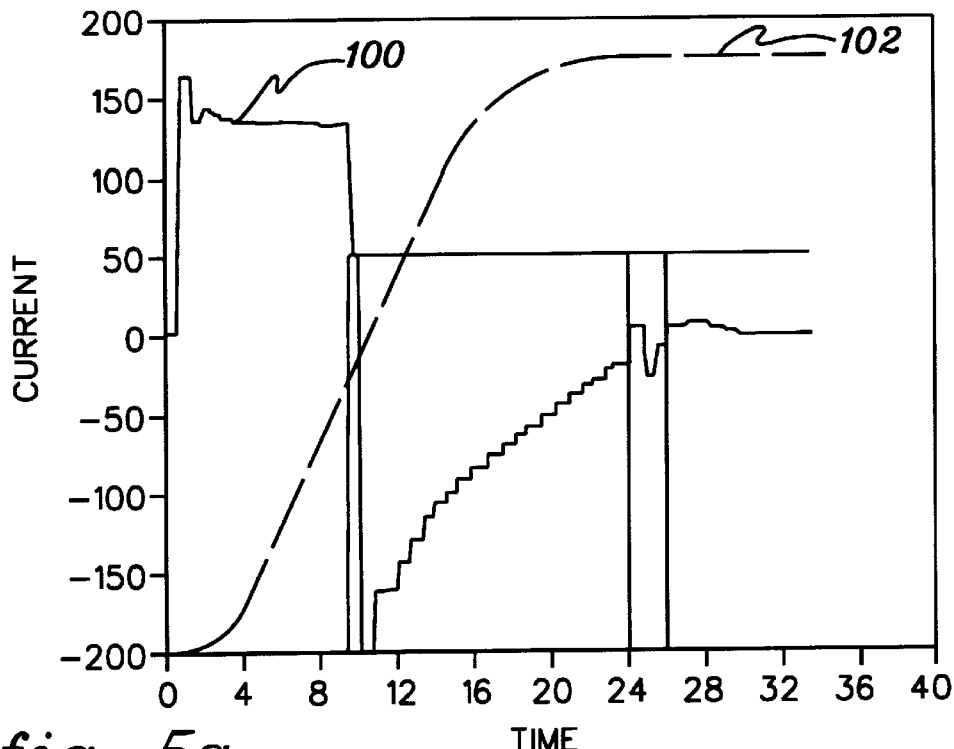
FIGS. 5a–d are time and spectral plots of conventional and oversampled output positioning value streams.
Figure 5B:
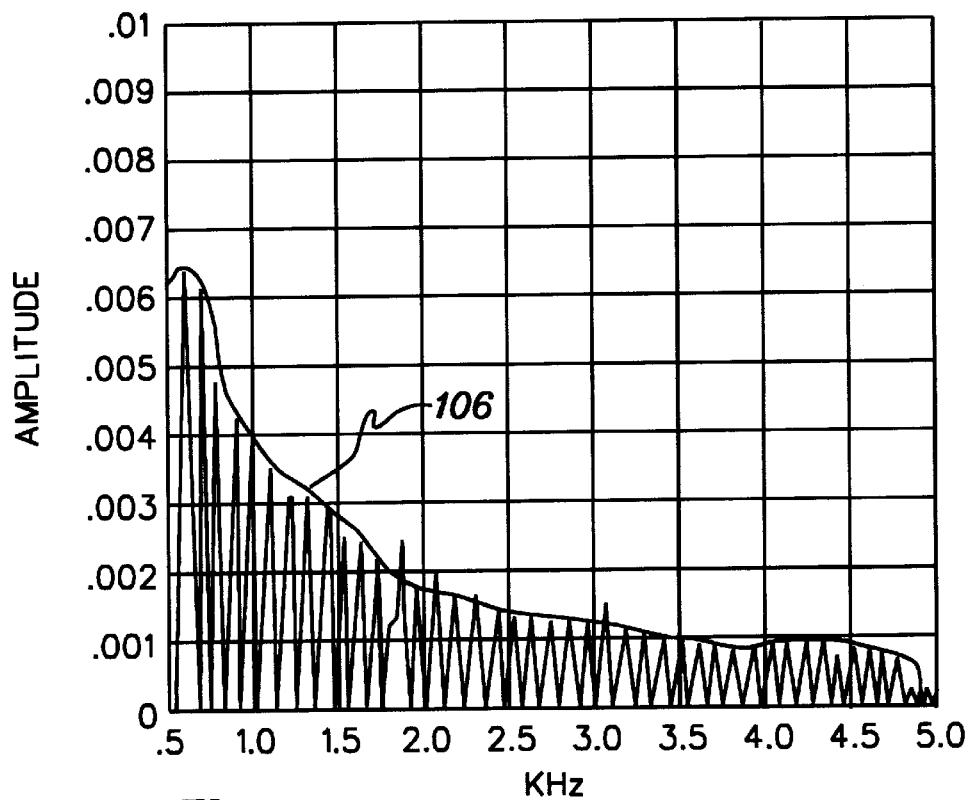
Figure 5C:
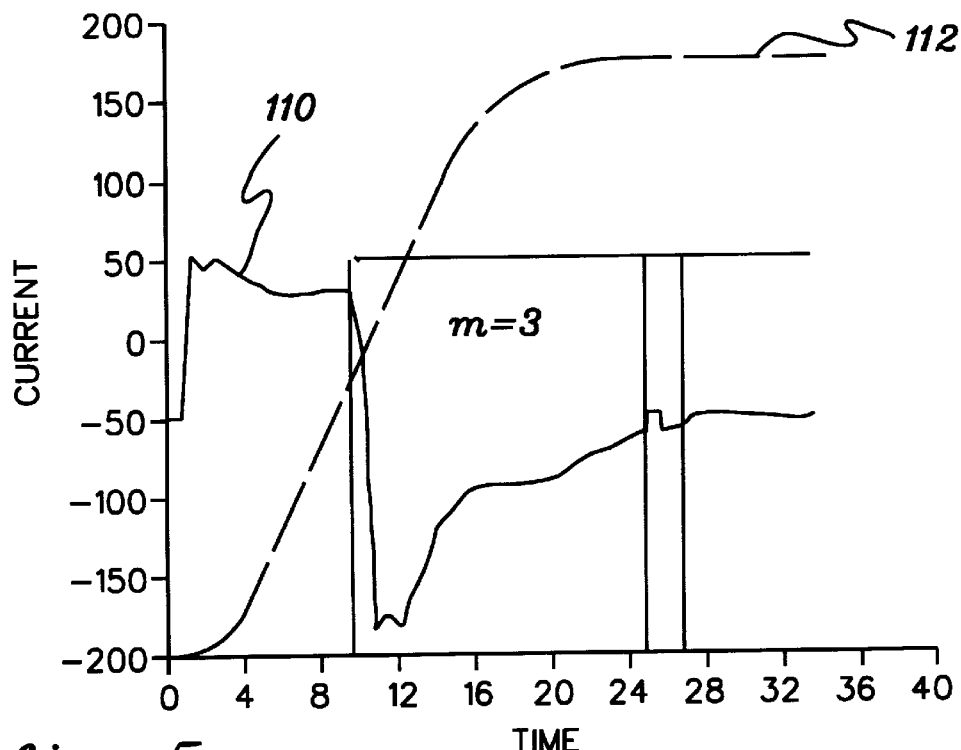
Figure 5D:
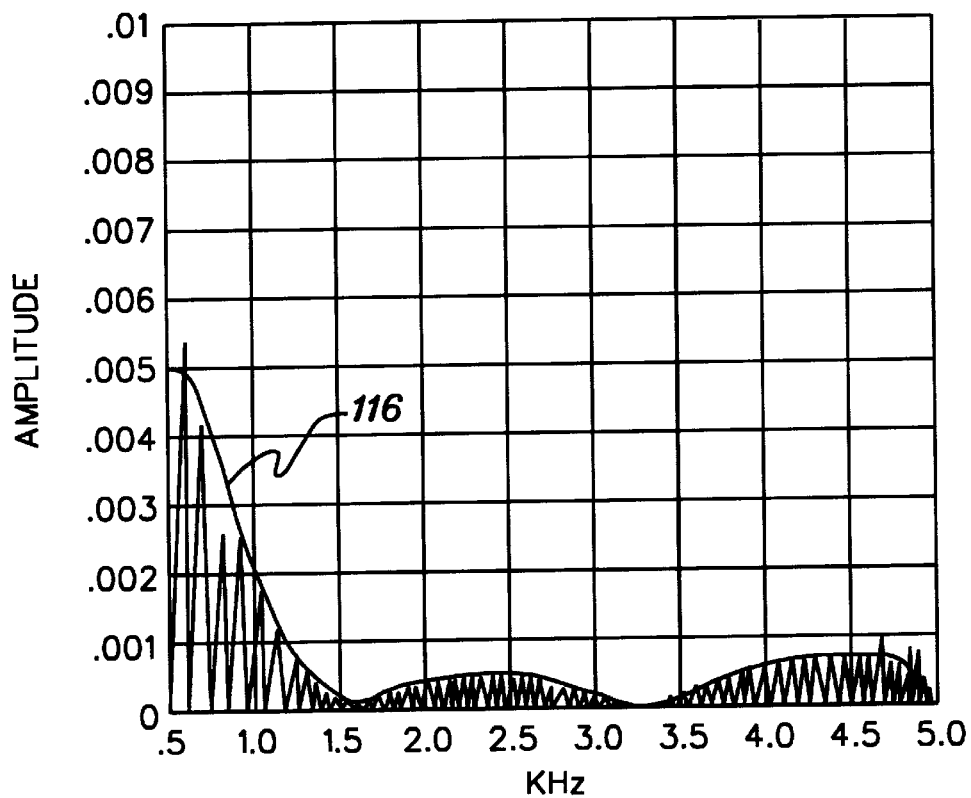

In FIG. 4a, the technique of oversampling is illustrated in which the system mechanics consist of a resonant mode with frequency equal to that of output sampling frequency ($2f_s$) of the servo. A pure tone build-up 82 is induced by the fixed sample rate output waveform 60. However, in FIG. 4b, the randomized output sampling rate waveform 70 results in a dissipation of the pure tone, as shown by waveform 84.

The results of a "servo-mechanics" model used to evaluate the roughness minimization oversampling are presented in FIGS. 5a–d. The time domain and spectral plots for conventional (FIGS. 5a–b) and oversampled (m=3) output (FIGS. 5c–d) cases with time domain seek trajectories (102, 112) and actuator currents (100, 110) are shown. In this example it can be seen that the improved actuator current spectrum 116 is generally reduced in magnitude from the conventional spectrum 106 in the high frequency range above 1000 Hz.

Figure 1:
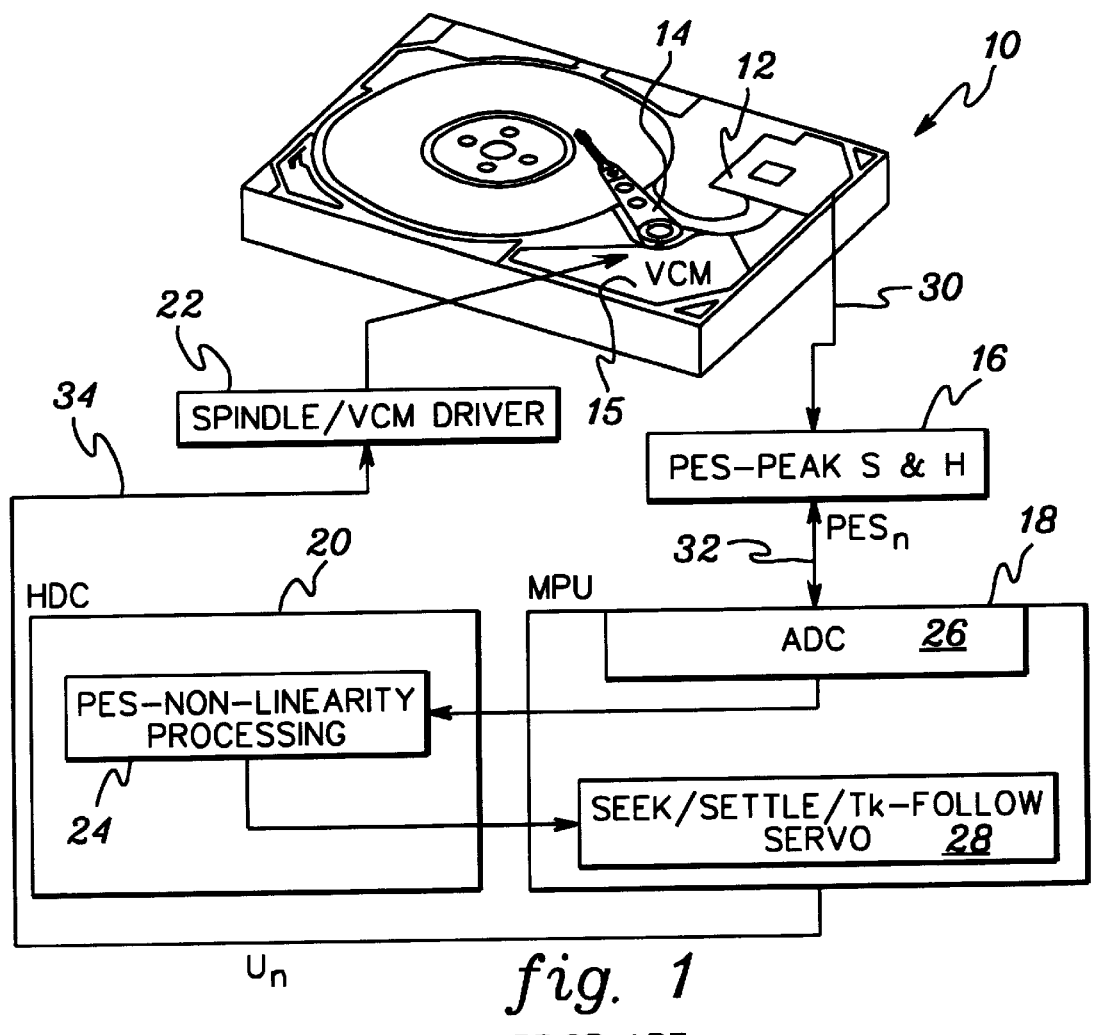
FIG. 1 depicts a conventional DASD having a positioning system therein for positioning an access device over the data storage medium.
Figure 6:
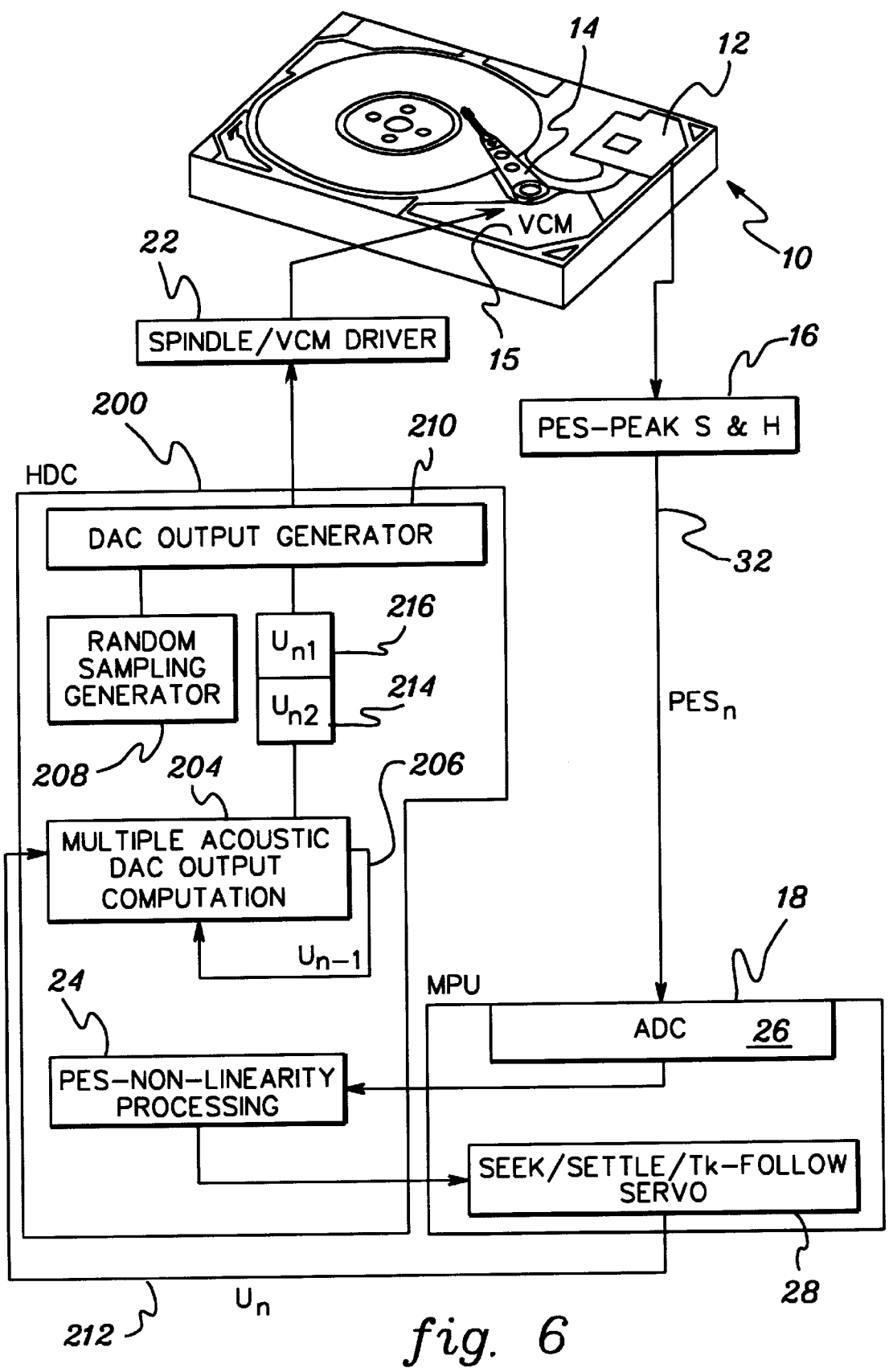
FIG. 6 is an exemplary DASD modified to produce a positioning value stream in accordance with the present invention.

FIG. 6 depicts an exemplary hardware implementation of a 2.5" DASD in accordance with the principles of the present invention. Like reference numerals are used to designate the like elements shown in FIG. 1. However, unlike FIG. 1, an improved HDC 200 is provided, within which now resides unit 204 for computing the intermediate positioning values between $U_n$ (212) and $U_{n-1}$ (206). In this case, the nominal output sampling was doubled, and thus two positioning values $U_{n1}$ (216) and $U_{n2}$ (214) are calculated as a function of a desired positioning value $U_n$ (212) and present positioning value $U_{n-1}$ (206). The improved HDC 200 performs the output generation 210 and timing randomization 208 operations, in accordance with specific techniques known to those skilled in the art. The MPU 18 simply computes the traditional control output $U_n$ for every $PES_n$.

Those skilled in the art will recognize that unit 204 performs the following calculations to produce $U_{n1}$ and $U_{n2}$:

$\Delta = U_n - U_{n-1}$
$J = \Delta/2$
$U_{n1} = U_{n-1} + J$
$U_{n2} = U_{n1} + J$ "J" as calculated in this example represents one half of the amplitude jump $\Delta$ normally encountered in conventional systems.

Figure 7A:
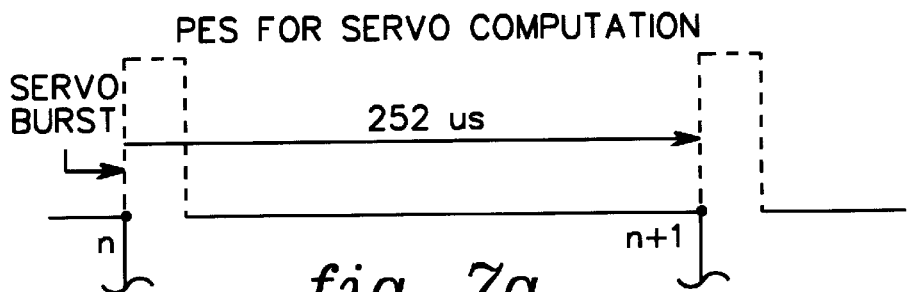
FIGS. 7a–d are time-averaged, raster representations of observed characteristics of positioning bursts, positioning values, fixed oversampling positioning values, and randomized oversampling positioning values, respectively.
Figure 7B:
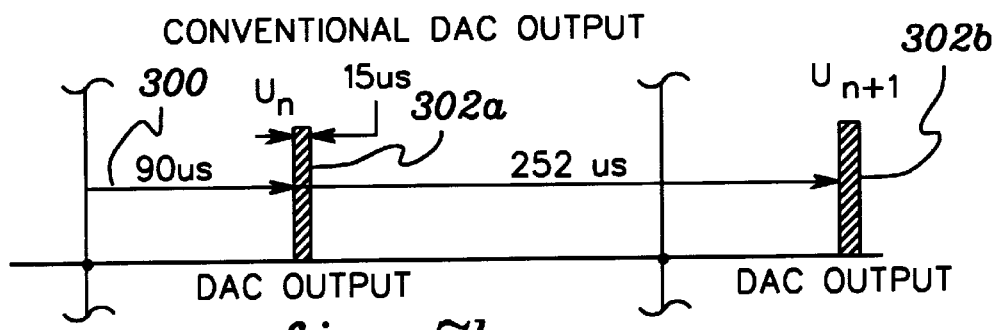

FIGS. 7a–7d show the actual timing (in time-averaged, raster format) used to generate an output data stream, the spectral characteristics of which are depicted in FIGS. 8–9. In the conventional sampling mode, the interval between two PES samples is 252 us(microseconds) as shown in FIG. 7a. Due to MPU operation and the PES conversion process, there is a minimum delay 300 of 90 us before the first DAC output positioning value appears. In addition, there is an unavoidable variance of 15 us (minimum to maximum time) present for the conventional positioning values (302a, 302b) as shown in FIG. 7b.

Figure 7C:
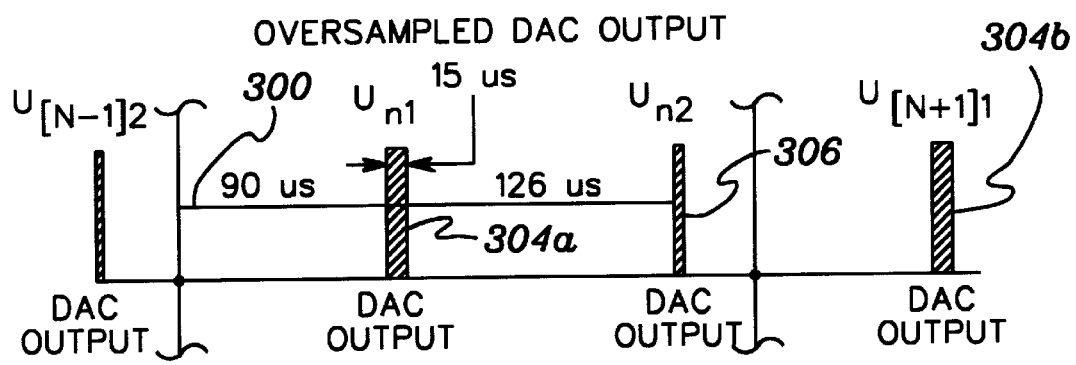

In the case of fixed frequency oversampling as shown in FIG. 7c, first DAC output 304a still occurs after 90 us from receiving the positioning (servo) burst ready signal. The second, intermediate DAC output 306 occurs 126 us following the first DAC output, and has no process induced variance. The cycle repeats beginning with output 304b.

Figure 7D:
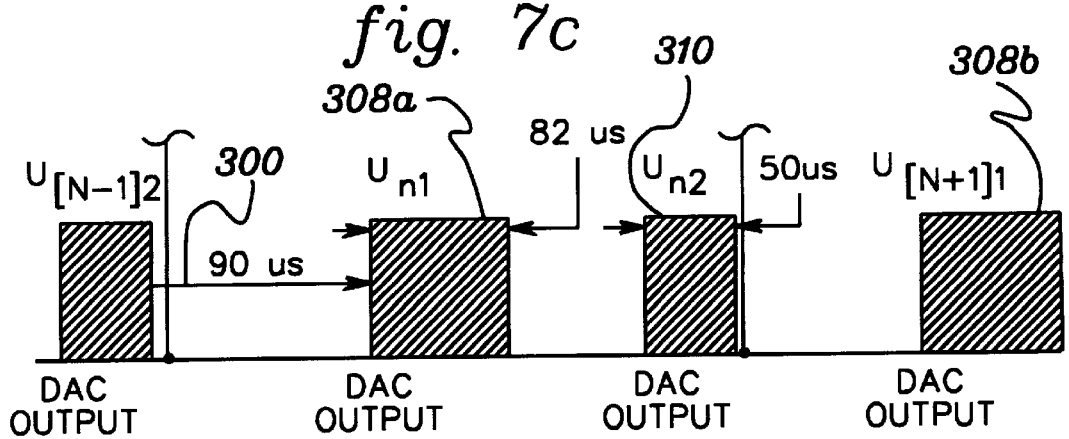

For the combination of randomized oversampling, FIG. 7d depicts the time-averaged intentionally random times at which the positioning values are provided. The first DAC output value 308a has 82 us variance and the second intermediate DAC output 310 has 50 us variance. Again, the cycle repeats beginning with output value 308b.

Figure 8A:
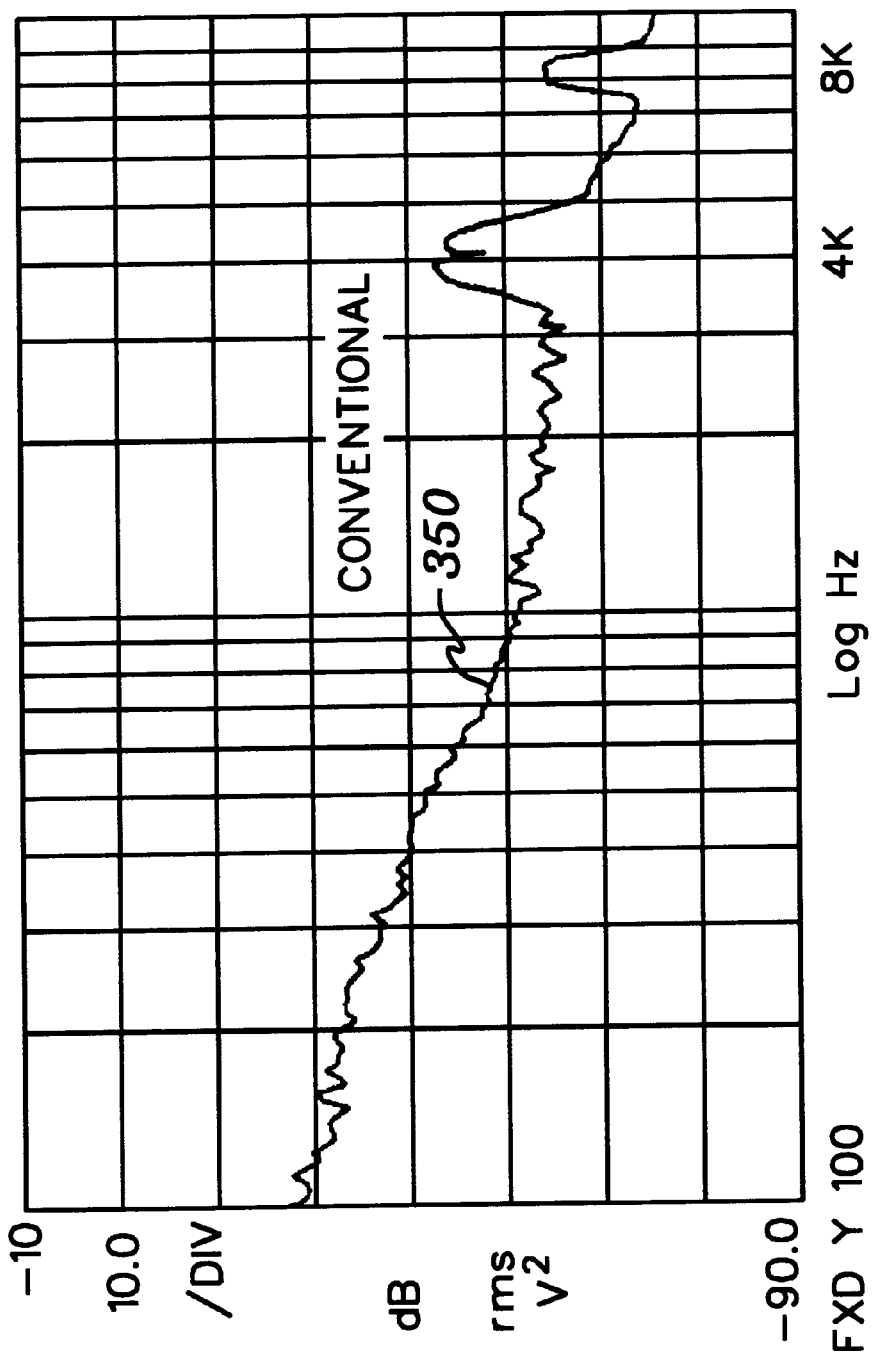
FIGS. 8a–b represent a spectral comparison of the waveforms of FIG. 7b and FIG. 7c.
Figure 8B:
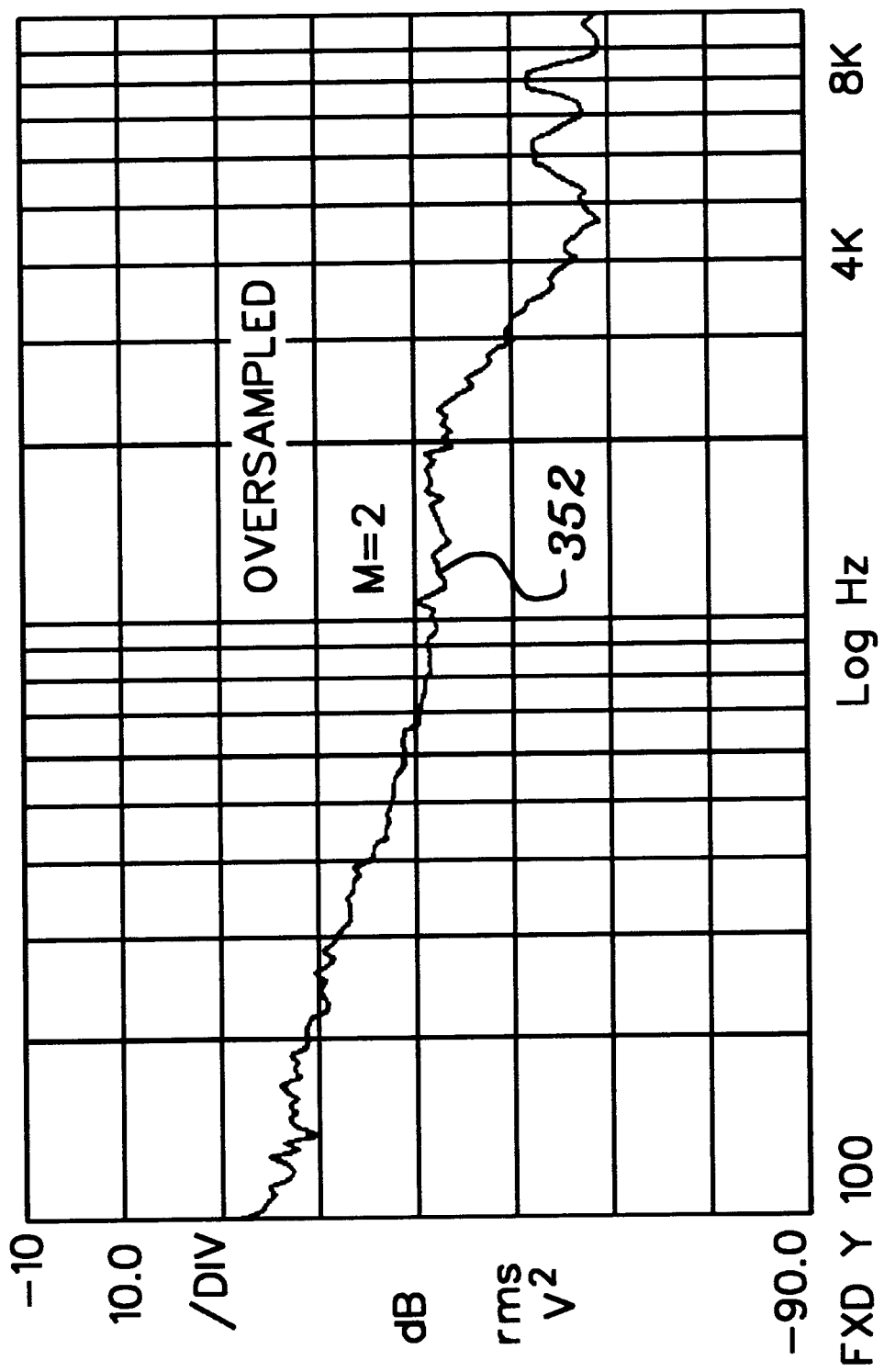

FIG. 8a and FIG. 8b represent a spectral comparison (waveforms 350, 352) of conventional and fixed over-sampled voice coil motor (VCM) voltage power spectra corresponding to the waveforms of FIG. 7b and FIG. 7c. It can be seen that the spectrum has been reshaped, and the peak value present at 4 kHz has been eliminated, but a new peak appears at 6 kHz with much lower (12 dB change) peak value. A second mode at 8 kHz seems to be unaffected by the oversampling operation.

Figure 9A:
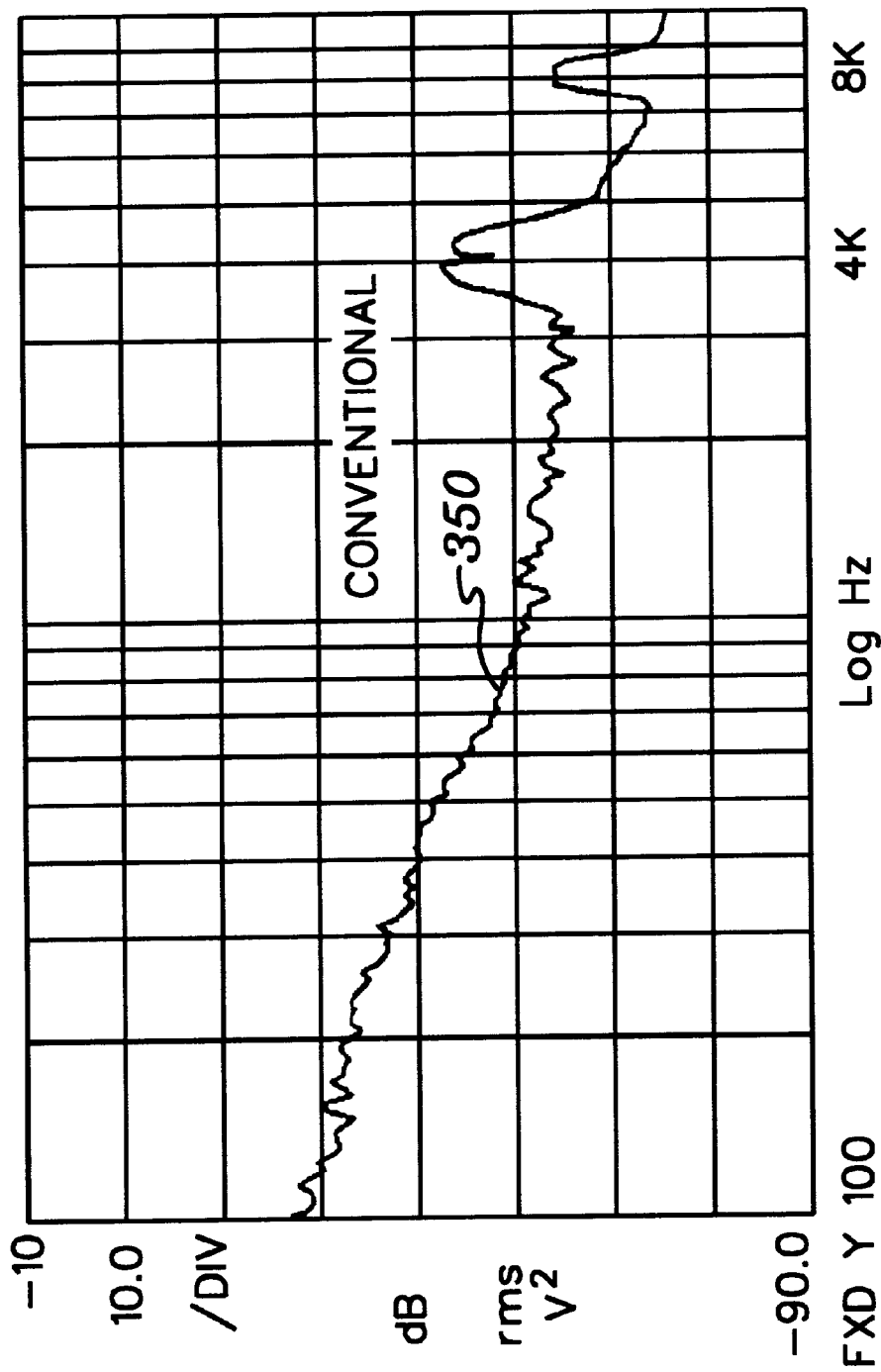
FIGS. 9a–b represent a spectral comparison of the waveforms of FIG. 7b and FIG. 7d.
Figure 9B:
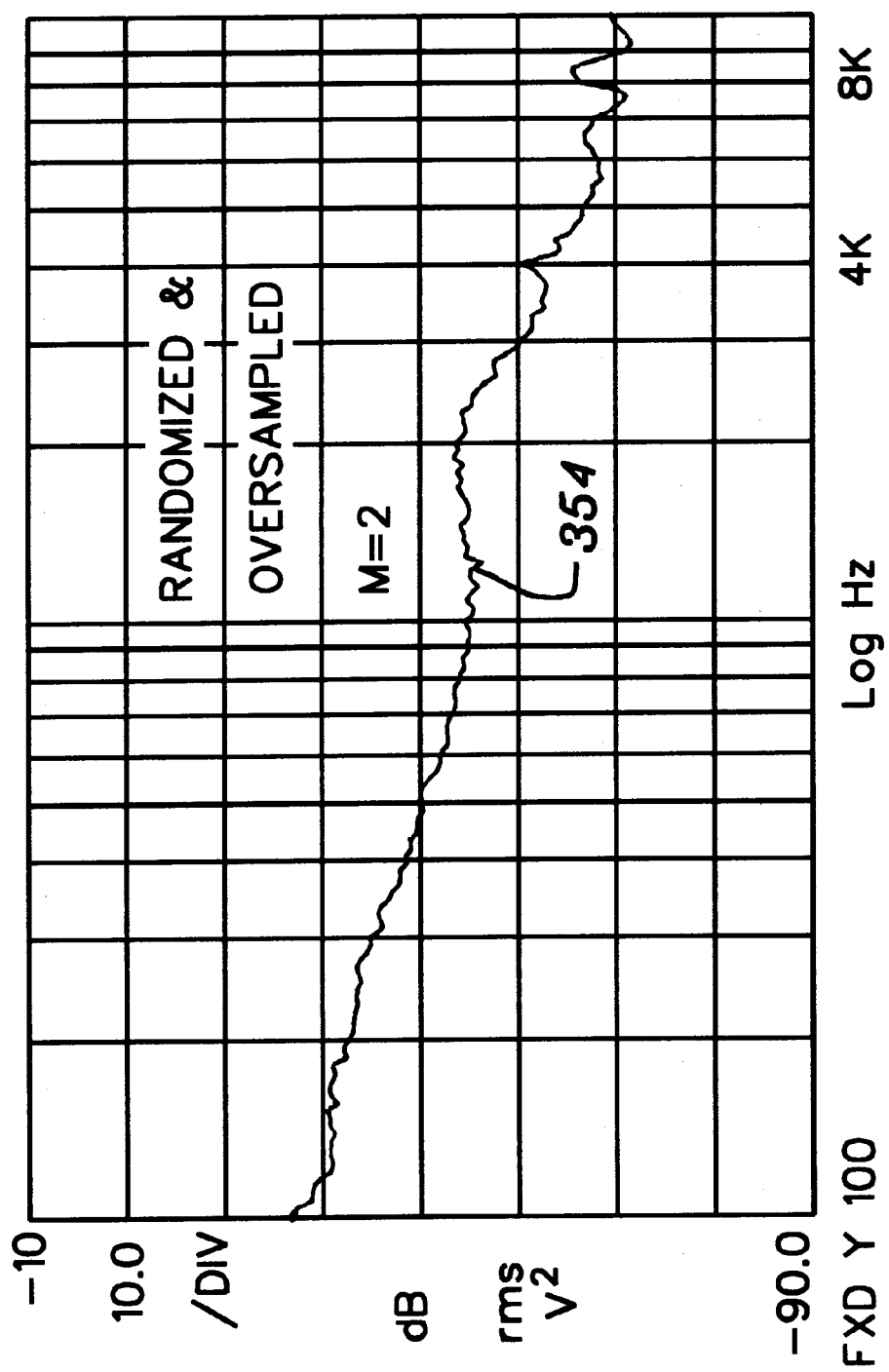

FIG. 9a and FIG. 9b represent a spectral comparison (waveforms 350, 354) of the conventional and randomized oversampling cases, corresponding to the waveforms of FIG. 7b and FIG. 7d. The power spectrum for this case (354) appears very close to the fixed oversampled case (352) of FIG. 8b, with further reduction in the 6 kHz peak and a slight increase in the 4 kHz peak.

This resultant data confirms that randomized oversampling produces a spectrum comparable to that of fixed oversampling while minimizing the potential for pure tone acoustic generation. Randomized output is therefore an effective software solution in the presence of sample rate-based "pure tone" mode when a product hardware design or magnetic sector format could not be changed readily.

While the invention has been described in detail herein in accordance with certain preferred embodiments thereof, many modifications and changes therein may be effected by those skilled in the art. Accordingly, it is intended by the following claims to cover all such modifications and changes as fall within the true spirit and scope of the invention.

What is claimed is:

1. A method for positioning an access device used to access data on a data storage medium, the data storage medium having a stream of positioning bursts stored thereon, the method comprising:

(a) moving the data storage medium relative to a sensing device such that at least some sequential positioning bursts of the stream of positioning bursts move past the sensing device at a first frequency;

(b) sensing the at least some sequential positioning bursts with the sensing device; and (c) positioning the access device using a stream of positioning values generated at a second frequency greater than the first frequency, one or more positioning values of the stream of positioning values being calculated as a function of respective bursts of the at least some sequential positioning bursts, wherein said positioning the access device (c) includes, for first and second sensed sequential positioning bursts of the at least some sequential positioning bursts:

(i) generating a desired positioning value relative to a present positioning value, the present positioning value determined by the first sequential positioning burst, the desired positioning value determined by the second sequential positioning burst; and (ii) interpolating an intermediate positioning value having an amplitude guaranteed as substantially always between the present positioning value and the desired positioning value, such that the generated stream of positioning values includes the desired positioning value and the intermediate positioning value, wherein the amplitude of the intermediate positioning value guaranteed as substantially always between the present positioning value and the desired positioning value serves to promote avoidance of acoustic noise during said positioning the access device (c).

2. The method of claim 1, wherein said positioning the access device (c) further includes, for the first and second sensed positioning bursts of the at least some sequential positioning bursts:

(iii) a first positioning of the access device using the intermediate positioning value; and (iv) thereafter a second positioning of the access device using the desired positioning value.

3. The method of claim 2, wherein said positioning the access device (c) includes, for each sequential pair of positioning bursts of the at least some sequential positioning bursts:

performing said generating step (i), said interpolating step (ii), said first positioning step (iii), and said second positioning step (iv).

4. The method of claim 1, wherein the amplitude of the intermediate positioning value is halfway between the amplitude of the present positioning value and the amplitude of the desired positioning value.

5. The method of claim 1, wherein the second frequency is an integer multiple of the first frequency.

6. The method of claim 5, wherein the second frequency is two or three times the first frequency.

7. The method of claim 1, wherein the sensing device and the access device are the same device, or components of the same actuator or head system.

8. A method for positioning an access device used to access data on a data storage medium, the data storage medium having a stream of positioning bursts stored thereon, the method comprising:

moving the data storage medium relative to a sensing device;

sensing first and second sequential positioning bursts of the stream of positioning bursts with the sensing device;

generating at least two positioning signal values as a function of a present position and a desired position of the access device, wherein the at least two positioning values include at least one intermediate positioning value and a desired positioning value, each of the at least one intermediate positioning value having an interpolated amplitude guaranteed as substantially always between the desired positioning value and a present positioning value, the present positioning value corresponding to the present position of the access device and the desired positioning value corresponding to the desired position of the access device, the present position determined substantially by the first sensed positioning burst and the desired position determined substantially by the second sensed sequential burst; and positioning the access device at the desired position by asserting the at least two positioning values at at least two respective times, wherein the amplitude of each of the at least one intermediate positioning value guaranteed as substantially always between the present positioning value and the desired positioning value serves to promote avoidance of acoustic noise in said access device.

9. The method of claim 8, wherein positioning the access device comprises first positioning the access device to the intermediate position corresponding to the at least one intermediate positioning value and thereafter to the desired position.

10. The method of claim 8, wherein the at least one intermediate positioning value comprises a single intermediate positioning value, and wherein an interval between the two respective times at which the single intermediate value and the desired positioning value are asserted is one half of the interval between which the first sense positioning burst and the second sensed sequential positioning burst of the stream of positioning bursts are sensed by the sensing device.

11. The method of claim 8, wherein said sensing includes:

sensing at least some sequential positioning bursts, including the first and second positioning bursts, of the stream of positioning bursts with the sensing device.

12. The method of claim 11, wherein the at least some sequential bursts are sensed at a first frequency determined by a rate at which the data storage medium is moved past the sensing device, and wherein the at least two respective times occur at a second frequency, the second frequency being greater than the first frequency.

13. The method of claim 12, wherein the second frequency is an integer multiple of the first frequency.

14. The method of claim 13, wherein the second frequency is two or three times the first frequency.

15. The method of claim 8, wherein the sensing device and the access device are the same device or components of the same actuator or head system.

16. A system for positioning an access device used to access data on a data storage medium, the data storage medium having a stream of positioning bursts stored thereon, the system comprising:

(a) means for moving the data storage medium relative to a sensing device such that at least some sequential positioning bursts of the stream of positioning bursts move past the sensing device at a first frequency;

(b) means for sensing the at least some sequential positioning bursts with the sensing device; and (c) means for positioning the access device using a stream of positioning values generated at a second frequency greater than the first frequency, one or more positioning values of the stream of positioning values being calculated as a function of respective bursts of the at least some sequential positioning bursts, wherein said means for positioning the access device (c) includes, for first and second sensed sequential positioning bursts of the at least some sequential positioning bursts:

(i) means for generating a desired positioning value relative to a present positioning value, the present positioning value determined by the first sequential positioning burst, the desired positioning value determined by the second sensed sequential positional burst; and (ii) means for interpolating an intermediate positioning value having an amplitude guaranteed as substantially always between the present positioning value and the desired positioning value, such that the generated stream of positioning values includes the desired positioning value and the intermediate positioning value, wherein the amplitude of the intermediate positioning value guaranteed as substantially always between the present positioning tie and the desire positioning-value serves to promote avoidance of acoustic noise from said means for positioning the access device.

17. The system of claim 16, wherein said means for positioning the access device (c) further includes, for the first and second sensed positioning bursts of the at least some sequential positioning bursts:

(iii) means for a first positioning of the access device using the intermediate positioning value; and (iv) subsequent means for a second positioning of the access device using the desired positioning value.

18. The system of claim 17, wherein said means for positioning the access device (c) performs, for each sequential pair of positioning bursts of the at least some sequential positioning bursts:

said generating (i), said interpolating (ii), said first positioning (iii), and said second positioning (iv).

19. The system of claim 16, wherein the amplitude of the intermediate positioning value is halfway between the amplitude of the present positioning value and the amplitude of the desired positioning value.

20. The system of claim 16, wherein the second frequency is an integer multiple of the first frequency.

21. The system of claim 20, wherein the second frequency is two or three times the first frequency.

22. The system of claim 16, wherein the sensing device and the access device are the same device, or components of the same actuator or head system.

23. A system for positioning an access device used to access data on a data storage medium, the data storage medium having a stream of positioning bursts stored thereon, the system comprising:

means for moving the data storage medium relative to a sensing device;

means for sensing first and second sequential positioning bursts of the stream of positioning bursts with the sensing device;

means for generating at least two positioning signal values as a function of a present position and a desired position of the access device, wherein the at least two positioning values include at least one intermediate positioning value and a desired positioning value, each of the at least one intermediate positioning value having an interpolated amplitude guaranteed as substantially always between the desired positioning value and a present positioning value, the present positioning value corresponding to the present of the access device and the desired positioning value corresponding to the desired position of the access device, the present position determined substantially by the first sensed positioning burst and the desired position determined substantially by the second sensed sequential burst; and means for positioning the access device at the desired position by asserting the at least two positioning values at at least two respective times, wherein the amplitude of each of the least one intermediate positioning value guaranteed as substantially always between the present positioning value and the desired positioning value serves to promote avoidance of acoustic noise from said means for positioning the access device.

24. The system of claim 23, wherein positioning the access device comprises first positioning the access device to the intermediate position corresponding to the at least one intermediate positioning value and thereafter to the desired position.

25. The system of claim 23, wherein the at least one intermediate positioning value comprises a single intermediate positioning value, and wherein an interval between the two respective times at which the single intermediate value and the desired positioning value are asserted is one half of the interval between which the first sensed positioning burst and the second sensed sequential positioning burst of the stream of positioning bursts are sensed by the sensing device.

26. The system of claim 23, wherein said means for sensing:

senses at least some sequential positioning bursts, including the first and second positioning bursts, of the stream of positioning bursts with the sensing device.

27. The system of claim 26, wherein the at least some sequential bursts are sensed at a first frequency determined by a rate at which the data storage medium is moved past the sensing device, and wherein the at least two respective times occur at a second frequency, the second frequency being greater than the first frequency.

28. The system of claim 27, wherein the second frequency is an integer multiple of the first frequency.

29. The system of claim 28, wherein the second frequency is two or three times the first frequency.

30. The system of claim 23, wherein the sensing device and the access device are the same device or components of the same actuator or head system.

* * * * *

UNITED STATES PATENT AND TRADEMARK OFFICE
CERTIFICATE OF CORRECTION

PATENT NO. : 6,181,507 B1　　　　　　　　　　　　　　　　Page 1 of 1
DATED : January 30, 2001
INVENTOR(S) : Kirazaki et al.

It is certified that error appears in the above-identified patent and that said Letters Patent is hereby corrected as shown below:

TITLE PAGE:

Item (75) Inventors, line 2, delete "Ayase" and replace with --Kanagawa-Ken--.

IN THE CLAIMS

Col. 8, line 55, delete "tie and the desire positioning-value" and replace with --value and the desired positioning value--.

Col. 8, line 57, delete "device" and replace with --device(c)--.

Col. 9, line 35, delete "present of" and replace with --present position of --.

Signed and Sealed this

Fifth Day of June, 2001

Attest:

Attesting Officer

NICHOLAS P. GODICI
*Acting Director of the United States Patent and Trademark Office*